UNITED STATES PATENT OFFICE.

JOHN M. HARTMAN, OF PHILADELPHIA, PENNSYLVANIA.

IMPROVEMENT IN TREATING SLAG FROM IRON FURNACES FOR REDUCTION.

Specification forming part of Letters Patent No. 130,578, dated August 20, 1872.

Specification describing the Treatment of the Slag containing Iron from Puddling and other Furnaces for Reduction in a Blast-Furnace.

At present the slag is charged in the blast-furnace with coal, ore, and limestone to reduce it and smelt the iron from it, which produces a highly silicious iron, both cold and red short, of an inferior quality, and also destroys the lining of the furnace. Slag in its raw state is very difficult to reduce, owing to an excess of silicic acid, its dense solid structure, and to the presence of sulphur and phosphorus. The dense solid structure of the lumps prevents the carbonic-oxide gas in the blast-furnace from acting on the interior of the lumps to displace the oxygen. At a temperature of about 1400° the lumps of slag have a pasty coating formed on them, which prevents their reduction in the upper part of the blast-furnace. They must gradually settle down, and be reduced by direct contact with solid carbon, which process is attended by loss of iron and a yield of poor quality. The sulphur and phosphorus in the slag unite with the iron, thereby causing bad results.

To overcome the objections hereinbefore mentioned, I mix carbon, in quantities proper for reduction, with the slag while in a molten state, which makes the slag porous, and being in intimate mixture with the iron in the slag the resulting iron is more carbonized and of a better quality. The slag in this condition is nearly of the composition of black-band iron ore, from which the fine grades of Scotch No. 1 pig is made, and which is noted for easy reduction.

To overcome the acidity of the slag, I mix with it, while in a molten state, limestone, to neutralize the silicic acid. To overcome the density and solidity of the slag structure, I mix with it, while in a molten state, limestone, in about the proportion of seven parts of limestone to five parts of silica in the slag. The escape of the carbonic acid from the limestone through the molten mass makes the slag porous and honey-combed. To overcome the sulphur and phosphorus, I mix with the slag, while in a molten state, black oxide of manganese, which combines with the sulphur and phosphorus, and is discharged from the blast as cinder.

To make a good resulting-fluid cinder from the blast-furnace, I mix alumina with the slag while in a molten state.

To overcome the acidity of the slag and neutralize the sulphur and phosphorus when black oxide of manganese is not to be had, I mix with it manganese, fluorine, and potash or soda, while the slag is in a molten state. Part of the sulphur and phosphorus is volatilized and part escapes with the resulting cinder of the furnace.

To obtain good results, I mix with the slag, while in a molten state, limestone, alumina, and coal or carbon, in the proportion of seven parts of limestone, two parts of alumina, and ten parts of coal to every five parts of silica in the slag; also, sufficient black oxide of manganese is contributed to discharge the sulphur and phosphorus.

The end and design of the invention is to render the slag porous and honey-combed after setting and cooling, and also to neutralize the acidity of the slag, and to discharge the sulphur and phosphorus. The slag, when in a molten state, can be made porous by forcing water or air through it, but neither will neutralize the acidity of the slag nor discharge the sulphur and phosphorus.

I wish it distinctly understood that I do not confine myself to the proportions as given above, but will vary them as circumstances may require.

I claim as my invention—

1. Making porous or honey-combing the slag from puddling, boiling, heating, refining, and other furnaces, for the purpose described.

2. Carbonizing slag from puddling and other furnaces, for the purpose shown and described.

3. Eliminating from the slag from puddling and other furnaces, sulphur and phosphorus, by the use and application of the black oxide of manganese.

4. Neutralizing the acidity of the slag from puddling and other furnaces, and eliminating the sulphur and phosphorus of the same by the use and application of manganese, fluorine, alumina, and potash or soda.

5. The use and application of any of the above-named ingredients, either alone or compounded, for the purpose described.

In testimony whereof I hereunto sign my name in presence of two subscribing witnesses.

JOHN M. HARTMAN.

Witnesses:
MICHAEL MALOY,
T. CHAMBERS.